Aug. 18, 1931.  A. A. LECLERC  1,819,372
AUTOMATIC TRAIN PIPE COUPLING HEAD
Original Filed April 4, 1921
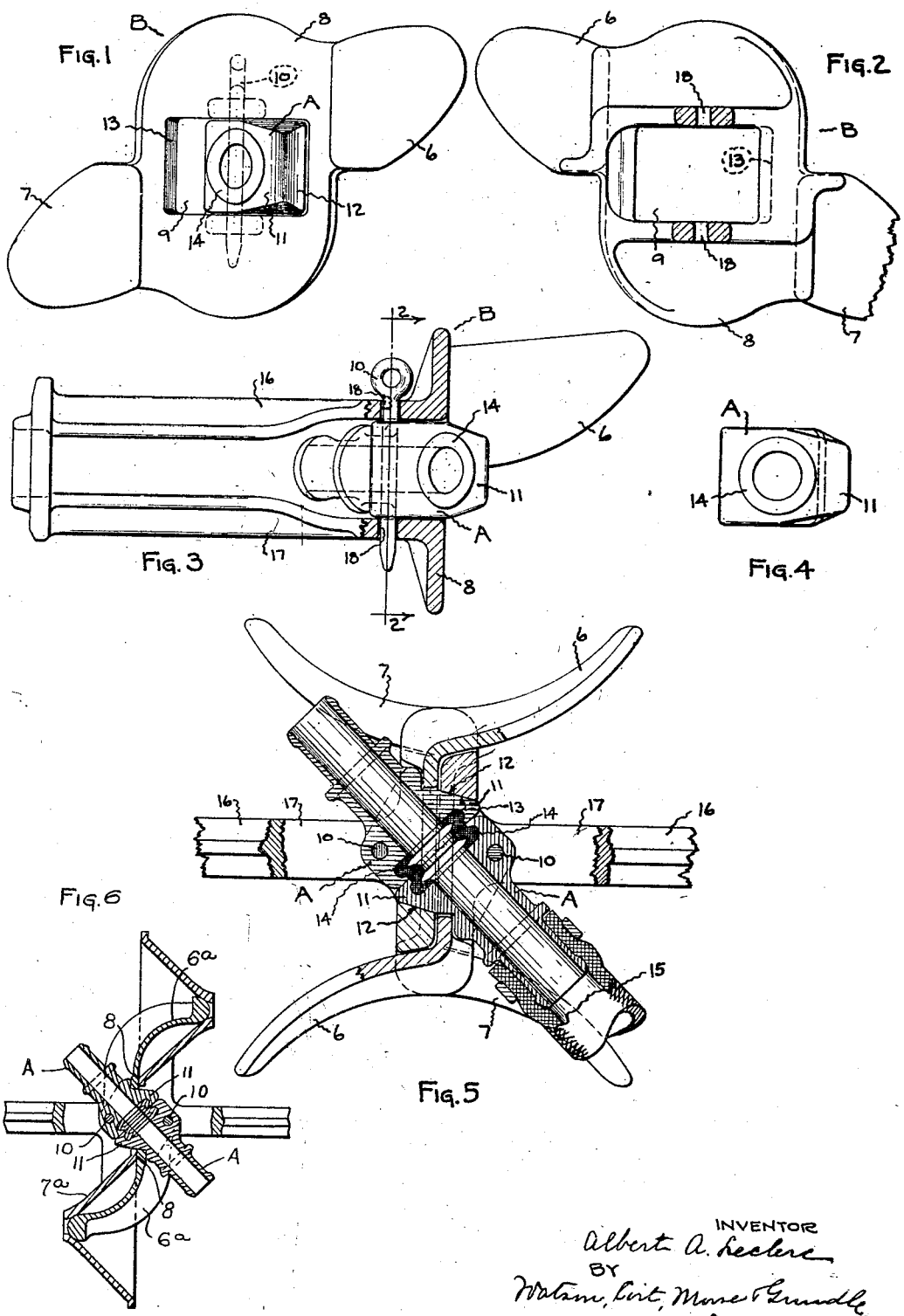

Patented Aug. 18, 1931

1,819,372

UNITED STATES PATENT OFFICE

ALBERT A. LECLERC, OF WESTMOUNT, QUEBEC, CANADA, ASSIGNOR TO JOSEPH ROBINSON, OF WESTMOUNT, QUEBEC, CANADA

AUTOMATIC TRAIN PIPE COUPLING HEAD

Application filed April 4, 1921, Serial No. 458,596. Renewed June 25, 1929.

My invention relates to improved coupling heads for automatic train pipe couplings or connectors and has among its objects to provide a simple construction of coupling head in which the tendency of the fluid pressure carried to separate the heads is effectually minimized. A further object is to provide an improved form of conduit for conveying a fluid through the head.

With the above and other objects in view my invention resides in the combinations, arrangement and constructions hereinafter described, pointed out in the appended claims, and illustrated in the accompanying drawings in which:

Figure 1 is a front elevation of one type of my improved coupling head and fitting.

Figure 2 is a rear view of the coupling head taken on the line 2—2 of Figure 3. In this view the fitting A and the pin 10 are omitted, and one of the guiding prongs is broken away.

Figure 3 is a vertical section through the center of my improved coupling head. In this view the fitting A and the pin 10 are shown in elevation.

Figure 4 is a front elevation of the fitting A used with my improved coupling head, and Figure 5 is a sectional plan view through a pair of my improved coupling heads in the coupled position.

Fig. 6 is a view similar to Figure 5 on a reduced scale showing another type of head.

Referring to the drawings, my improved coupling head comprises suitable guiding means which may be of the wing type as shown particularly in Figure 1 having wings or prongs 6 and 7, or it may be of the pin and funnel type commonly known in the art and shown in Figure 6 having a pin 6a and a funnel 7a. In both forms illustrated the head is provided with a base having a meeting or coupling face 8 arranged at substantially a right angle to the longitudinal direction of the head or connector, and said face is provided with an oblong opening 9 extending therethrough. Within this opening I mount a fitting or conduit A and pivotally mount it on the head by any suitable means, such as a pin 10. The fitting A when in position forms in effect a part of the coupling head and the same is provided with a forwardly extending tongue or portion 11 having an inclined face 12 adapted to mate with a correspondingly shaped wall 13 in the opening 9 of the opposing coupling head. In the forward end of the fitting I provide a suitable gasket seat and mount therein any desired form of gasket 14. The fitting is so positioned in the head as to bring the center of the gasket on the longitudinal center line of the head when in the coupled position—see especially Figure 5. The rear end of the fitting A receives, in any suitable manner, the ordinary train pipe hose 15. Extending rearwardly from the head at positions above and below the opening 9 I provide straps or projections 16 and 17 which may project into or be otherwise connected with any suitable form of support for suspending my improved coupling head from the car. The pin 10 passes through openings 18 in these straps and through the fitting A as shown, to pivotally secure the fitting in position on the head, as aforesaid. The straps 16 and 17 together form a shank which extends rearwardly from and constitutes a support for the head.

In operation the tongue 11 of the fitting A enters the opening 9 of the opposing coupling head in the act of coupling, and contacts with the wall 13 shortly in advance of final register of the fitting. This contact and registration takes place immediately before the coupling face 8 of the mating coupling heads meet, thereby causing a wedging or cam action upon the engaging fittings A. In this manner the fittings are forced into rigid engagement, and the force of the fluid pressure carried tending to separate the fittings is spent against the wall 13 of the head and the pin 10. In this manner practically all tendency of the fluid pressure to force the coupling heads apart is effectually overcome.

In previous constructions of coupling heads the buffer spring, or other means employed to support the head from the car, is depended upon to overcome the pressure of the fluid carried, and maintain a tight joint between the faces of mating coupling heads. Where the fluid passes through the head on the longitudinal axis of the latter as is common in the art, and the pressure is of considerable extent, a pronounced tendency to force the heads apart is experienced. With my present improvement this tendency is minimized inasmuch as the fluid passes through the head at an angle to the longitudinal axis of the latter, and inasmuch also as the fittings carrying the fluid are so arranged with respect to mated coupling heads as to constitute practically a lock for the latter against the pressure of the fluid.

Since the fitting A is pivotally mounted in the head, as aforesaid, the hose 15 may move, under the vibration of the car, independent of movement of the coupling head, which arrangement provides means for flexibly connecting the hose to the head.

In case it is desired to remove a defective gasket from between the mating faces of the fittings A of two heads coupled together, it is but necessary to remove one of the pins 10 whereupon the fitting may be extracted and the defective gasket removed and a new one inserted. The fitting may then be replaced in position and the pin 10 inserted, the lower end 21 of the pin being tapered to adjust and guide the fitting into position. In this manner a simple and efficient means of renewing defective gaskets between the faces of mated coupling heads while the cars remain coupled, is provided. The various parts of my improvement are, of course, so arranged and proportioned as to permit of proper assembly and operation.

What I claim is:

1. An automatic train pipe coupling head, comprising suitable guiding means for aligning the head with a counterpart head, and a conduit pivotally mounted on the head and having a portion extending through the head and adapted to engage and rest against a rigid part of a mating head whereby when the two heads are connected said conduit is held against and in alignment with the conduit of the mating head.

2. An automatic train pipe coupling head, comprising a perforated base provided with a suitable guiding means, a fluid conduit extending through said base and pivotally mounted thereon, said conduit being provided with a tongue projecting beyond the forward face of said base and adapted to engage and rest against a complementary surface on a rigid part of a mating head to force and hold said conduit in firm engagement with a complementary conduit in said mating head in coupling.

3. In an automatic train pipe coupling head, comprising a perforated base and suitable guiding means, a conduit mounted in said perforation of the head, means for maintaining said conduit at all times with its axis arranged at an angle to the longitudinal axis of said head, said conduit being pivotally mounted in said perforation, and means rigid with the head for forcing and holding the conduit of a mating head in engagement with the conduit carried by the head.

4. An automatic train pipe coupling head, comprising in combination a perforated base having suitable guiding means, a conduit extending through said perforation and having a portion adapted to engage a complementary rigid surface in an opposing head whereby said conduit is moved against and held in firm engagement wth a counterpart conduit of a mating head, and means co-operating with said portion to minimize the tendency of the fluid pressure to separate said heads.

5. In a train pipe connector, in combination, a head having a coupling face arranged substantially at right angles to the longitudinal axis of the head, said head having a central portion, a guide rigidly secured to the head at each side of said central portion, said central portion having an opening extending therethrough between said guides, a conduit mounted in said opening obliquely to said coupling face, a gasket carried by the front end of said conduit and having a contacting surface arranged obliquely to said coupling face, said conduit and gasket being removable rearwardly from said opening while said head is coupled to a mating head, and means for removably securing said conduit in said opening.

6. In a train pipe connector, in combination, a head having a shank rigidly secured thereto and extending rearwardly therefrom, said head having a guide member on each side thereof and also having between said guide members a substantially flat portion arranged at right angles to the longitudinal axis of said shank, said portion having an opening therein in line with the axis of said shank, a conduit mounted in said opening obliquely to the longitudinal axis of said shank, a gasket mounted in said conduit and having a contacting surface arranged obliquely to said axis, said conduit and gasket being removable rearwardly from said opening while said head is coupled to a mating head and means for removably securing said conduit in said opening.

7. In a train pipe connector, in combination, a head having a coupling face arranged substantially at right angles to the longitudinal axis of the head and extending on both sides of said axis, said head having a central portion provided with an opening therethrough in line with said axis, a guide member rigidly secured to said head and arranged entirely on one side of said axis, a second guide member rigidly secured to said head and arranged entirely on the other side of said axis, a conduit mounted in said opening obliquely to said coupling face, a gasket carried by the front end of said conduit and having a contacting face arranged obliquely to said axis, said conduit and gasket being removable rearwardly from said opening and from the head while the head is coupled to a mating head, and means for removably securing said conduit in said opening and normally holding the same against substantial forward or rearward movement therein.

8. In a train pipe connector, in combination, a head having a substantially flat portion arranged at right angles to the longitudinal axis of the head, said flat portion having an opening therein in line with said axis, a guide member rigidly secured to said head and arranged entirely on one side of said axis, a second guide member rigidly secured to said head and arranged entirely on the other side of said axis, a conduit mounted in said opening obliquely to said coupling face, a gasket carried by the front end of said conduit and having a contacting face arranged obliquely to said flat portion, said conduit and gasket being removable rearwardly from said opening and from the head while the head is coupled to a mating head, and means for removably securing said conduit in said opening and normally holding the same against substantial forward or rearward movement therein.

In testimony whereof I affix my signature.

ALBERT A. LECLERC.